United States Patent [19]
Bahr et al.

[11] 3,722,216
[45] Mar. 27, 1973

[54] ANNULAR SLOT COMBUSTOR

[75] Inventors: Donald W. Bahr; Daniel L. Harshman, both of Cincinnati, Ohio

[73] Assignee: General Electric Company

[22] Filed: Jan. 4, 1971

[21] Appl. No.: 103,604

[52] U.S. Cl. ................................ 60/39.36, 60/39.74 R
[51] Int. Cl. ................................................ F02c 3/00
[58] Field of Search ............ 60/39.65, 39.74 R, 39.36

[56] References Cited

UNITED STATES PATENTS

| | | | |
|---|---|---|---|
| 2,646,664 | 7/1953 | Meschino | 60/39.65 |
| 2,647,369 | 8/1953 | Leduc | 60/39.65 |
| 2,698,050 | 12/1954 | Bloomer | 60/39.74 |
| 2,773,350 | 12/1956 | Barrett | 60/39.72 R |
| 3,007,310 | 11/1961 | Eisele | 60/39.69 |
| 3,430,443 | 3/1969 | Richardson | 60/39.65 |
| 3,570,242 | 3/1971 | Leonardi | 60/39.74 |
| 3,605,405 | 9/1971 | Du Bell | 60/39.74 |

Primary Examiner—Douglas Hart
Attorney—Derek P. Lawrence, Lee H. Sachs, Frank L. Neuhauser, Oscar B. Waddell and Joseph B. Forman

[57] ABSTRACT

A combustion system for a gas turbine engine is equipped with a fuel carbureting device which delivers a uniform fuel/air mixture to the primary combustion zone through a continuous annular slot. Fuel and air are provided as a continuous tangential flow to an annular premixing chamber, which is configured so as to provide an exit which comprises the continuous annular slot. Radial swirl vanes are positioned within this slot to turn the fuel/air mixture axially, while counter-swirl vanes surround the slot to provide additional primary combustion air to rapidly mix with the fuel/air mixture and to provide flame stabilization regions around the entire annular combustion chamber.

15 Claims, 5 Drawing Figures

INVENTORS.
DONALD W. BAHR
DANIEL L. HARSHMAN

AGENT

INVENTORS.
DONALD W. BAHR
DANIEL L. HARSHMAN

T. J. Bird, Jr.
AGENT

ANNULAR SLOT COMBUSTOR

BACKGROUND OF THE INVENTION

This invention relates generally to gas turbine engine combustion systems and, more particularly, to an annular slot type fuel/air carbureting system for annular combustors.

Gas turbine engine manufacturers are continually searching for methods and means whereby relatively compact gas turbine power plants having high power-to-weight ratios can be built more efficiently and more economically. A major problem in the production of such gas turbines is to provide machines that are shorter in length and lighter in weight than conventional machines without sacrificing performance or engine life. If such an engine could be produced, it would provide a number of basic advantages such as a reduction in the overall weight of the engine with an accompanying ability of an aircraft powered by such an engine to carry a greater payload. In addition, such an engine would require fewer main bearings and, in this respect, would be less complicated and less costly than some present day engines.

Gas turbine engines of the type generally referred to herein normally comprise a compressor, a primary combustion system, a turbine, a tail pipe (possibly including an augmenter combustion system), and a variable area exhaust nozzle. Conventionally, air enters an inlet and is compressed in the compressor, ignited along with high energy fuel in the primary combustion system, performs work while expanding through the turbine, and exits through the variable area nozzle. The high energy associated with gas exiting from the nozzle can be utilized to provide forward thrust to an aircraft powered by such an engine, to provide shaft horsepower for marine applications, to drive generators to produce electric power, etc.

One section of the gas turbine which has continually caused problems in engine manufacturers' attempts to shorten the overall length of the gas turbine engine is the primary combustion section. For advanced engine applications with ever increasing operating temperatures, short length and compact combustion systems take on even greater importance. Short length combustors not only minimize the problems associated with adequately cooling the combustion system liners, which define the primary combustion zone, but also result in reduced engine weight and reduced shaft length, as previously discussed. Furthermore, many advanced engine applications operate with combustor exit temperatures of 2,500°F and higher. At these temperature levels, precise control of the exit temperature pattern, both radially and circumferentially, is of major importance. Precisely controlled temperature distributions are essential to minimize adverse temperature gradients and to eliminate potential hot spots in the combustor liners and turbine nozzle vanes.

Another important requirement for combustors for advanced engine applications is that smoke emission and pollutants be reduced to the lowest possible levels. In order to achieve such reductions, it is necessary to achieve nearly "stoichiometric" burning conditions within the combustion zone. This, in turn, requires nearly uniform temperature profiles throughout the combustion zone.

The above-discussed problems have resulted in numerous carbureting combustor design concepts, in which high energy fuel is premixed with a portion of the combustor air flow prior to the combustion process in order to achieve complete intermixing of fuel and air prior to the burning process. This type of design has been found to provide compact, short length devices with well controlled exit temperature distributions. Many combustion systems of this kind are designed to operate without atomizing spray nozzles and, instead, to operate with simple, low pressure fuel injectors. In systems of this type, the kinetic energy of the combustor air flow is used to atomize the fuel. In addition to providing shorter combustion systems, these carbureting design approaches have also resulted in very low exhaust gas smoke emission.

In existing combustor designs, including carbureting combustor designs, the fuel is normally introduced into the combustion system annulus at a discrete number of locations. Typically, each of the fuel injectors is positioned in a swirl cup or other mixing device. The swirl cups are then arranged in an annular ring which is attached to the combustor dome. Thus, each swirl cup is a combustible fuel/air mixture source which provides, in part, a discrete flame stabilization region around the combustor annulus.

Because each swirl cup is a discrete identity, the fuel/air ratio distribution and the gas temperatures around the combustor annulus tend to be non-uniform in such a design. Localized streaks of high temperature gases are, in many cases, observable downstream of each of the swirl cups. Circumferential temperatures and fuel/air ratio variations of this type can result in localized hot spots and severe temperature gradients in the hot parts located downstream of the swirl cups. In many combustor designs, it is possible to minimize the effects of these non-uniform circumferential gas temperature patterns by air cooling techniques. However, this approach often requires the allocation of considerably increased proportions of the total air flow for cooling purposes, which can result in compromises in the overall performance characteristics of the combustor.

SUMMARY OF THE INVENTION

It is an object of this invention, therefore, to provide an annular combustor which has a uniform temperature profile in both the circumferential and radial directions.

Briefly stated, the object of this invention is achieved by providing a combustor in which fuel is uniformly introduced into the primary combustion zone around the entire combustor annulus. The combustion system includes an annular premixing chamber which is located immediately upstream of the primary combustion zone. Fuel is mixed within the chamber with a portion of the combustor air flow and the resulting mixture is introduced into the primary combustion zone through a continuous annular slot. Air is introduced into the premixing chamber by means of a number of air intakes located around the annulus; and fuel is introduced into each of these intakes by means of suitable fuel injectors. The fuel and air mixture created within the air intakes is turned approximately 90° and discharged into the premixing chamber. A plurality of swirl vanes are located around the premixing chamber to direct the resulting fuel/air mixture into the primary combustion zone through the continuous annular slot. As required, additional primary combustion air flow is introduced into the primary combustion zone by means or rings of counterswirl vanes located concentrically around the annular slot. This counter air flow provides effective and rapid mixing of the fuel/air mixture emitting from the premixing chamber with the additional primary combustion air. The counter air flow further provides flame stabilization regions around the entire annular slot.

DESCRIPTION OF THE DRAWINGS

While the specification concludes with a series of claims which distinctly claim and particularly point out the subject matter which Applicants consider to be their invention, an understanding of this invention will be gained from the following detailed description. This description is given in connection with the attached drawings, in which:

DESCRIPTION OF PREFERRED EMBODIMENTS

Figure 1:
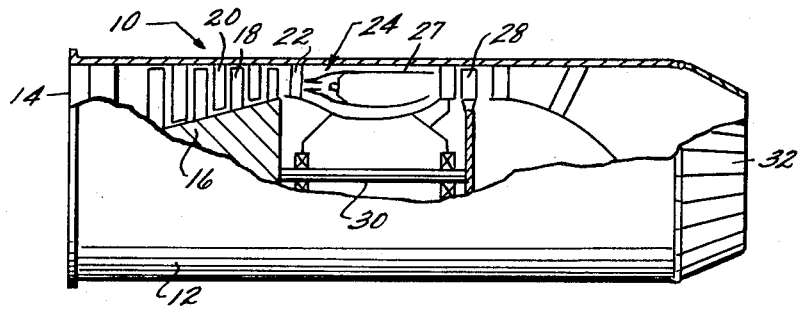
FIG. 1 is a schematic view, with portions deleted, of a gas turbine engine incorporating the subject invention.

Referring now to the drawings wherein like numerals correspond to like elements throughout, reference is initially directed to FIG. 1 wherein a gas turbine engine 10 includes a casing 12 forming an inlet 14, a compressor 16 having rows of rotor blades 18 interspersed between rows of stator vanes 20, which are affixed at their outer ends to the inner surface of the casing 12. At the downstream end of the compressor 16 is a row of compressor outlet guide vanes (OGVs) 22, followed by an annular diffuser passage or compressor discharge passage indicated generally at 24.

Figure 2:
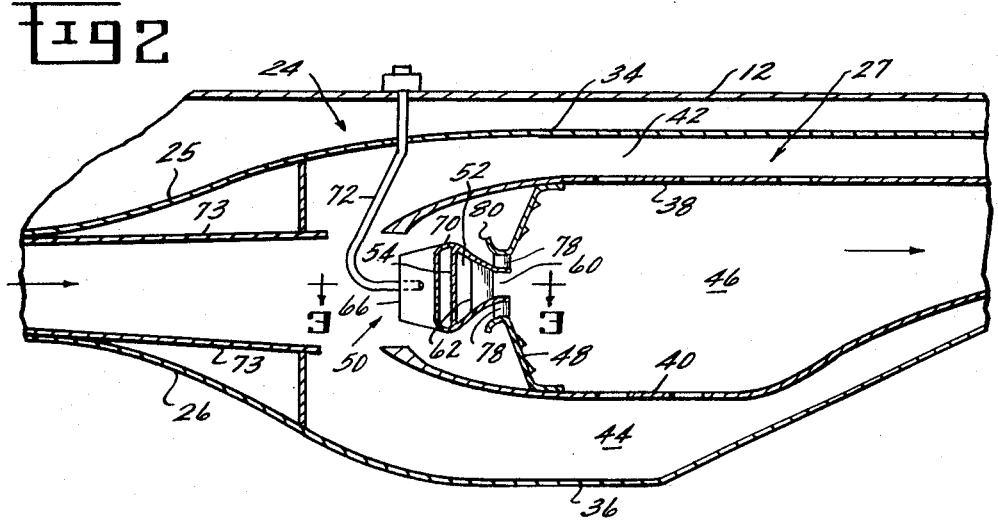
FIG. 2 is an enlarged, axial cross-sectional view of a combustion system constructed in accordance with the present invention.

The compressor discharge passage or diffuser passage 24 includes a pair of concentric outer and inner walls 25 and 26, respectively divergent in a downstream direction as shown in FIG. 2. The diffuser passage 24 delivers the pressurized air from the compressor 16 into a combustor, indicated generally at 27, in which the pressurized air is mixed with high energy fuel and ignited to provide a hot gas stream at high velocity through a turbine 28. The turbine 28 extracts work from the hot gas stream to drive the compressor 16 by means of a connecting shaft 30 on which both components are mounted. The hot gas stream then leaves the engine through an exhaust nozzle 32, which may be of the adjustable area type.

The above description is intended to be merely descriptive of one type of gas turbine engine to which the inventive combustion system may be applicable. As will become apparent from the following detailed description, the subject combustion system would be capable of use with any type gas turbine engine.

Referring again to the enlarged view of FIG. 2, it will be seen that the combustor 27 comprises an outer casing wall 34 and an inner casing wall 36 which are extensions of the diffuser walls 25 and 26, respectively. The outer and inner walls are spaced from a pair of outer and inner combustion chamber liners, indicated at 38 and 40 respectively, and appropriately supported within the combustor. As thus described the outer and inner combustor liners 38 and 40 cooperate with the outer and inner casing walls 34 and 36 to form three annular flow passages, an outer cooling passage 42, an inner cooling passage 44, and a primary combustion zone 46. The upstream end of the primary combustion zone 46 is clearly defined by means of a dome wall 48, which may be connected to the combustor liners 38 and 40 in any suitable manner.

Figure 3:
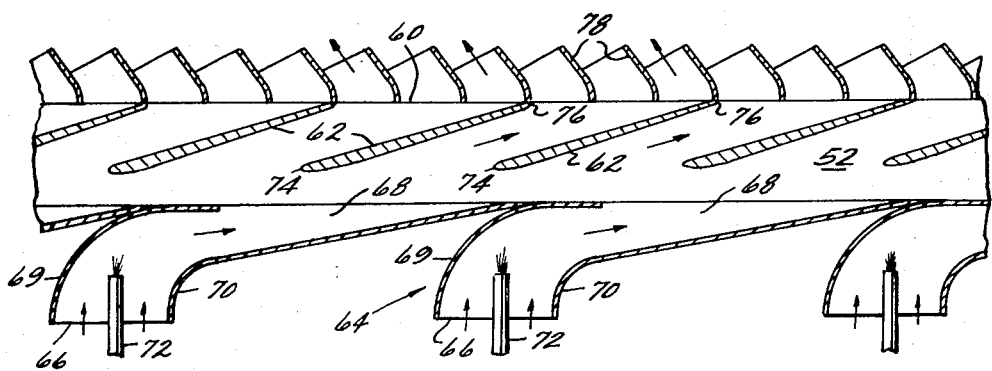
FIG. 3 is a sectional view taken along line 3—3 of FIG. 2.
Figure 4:
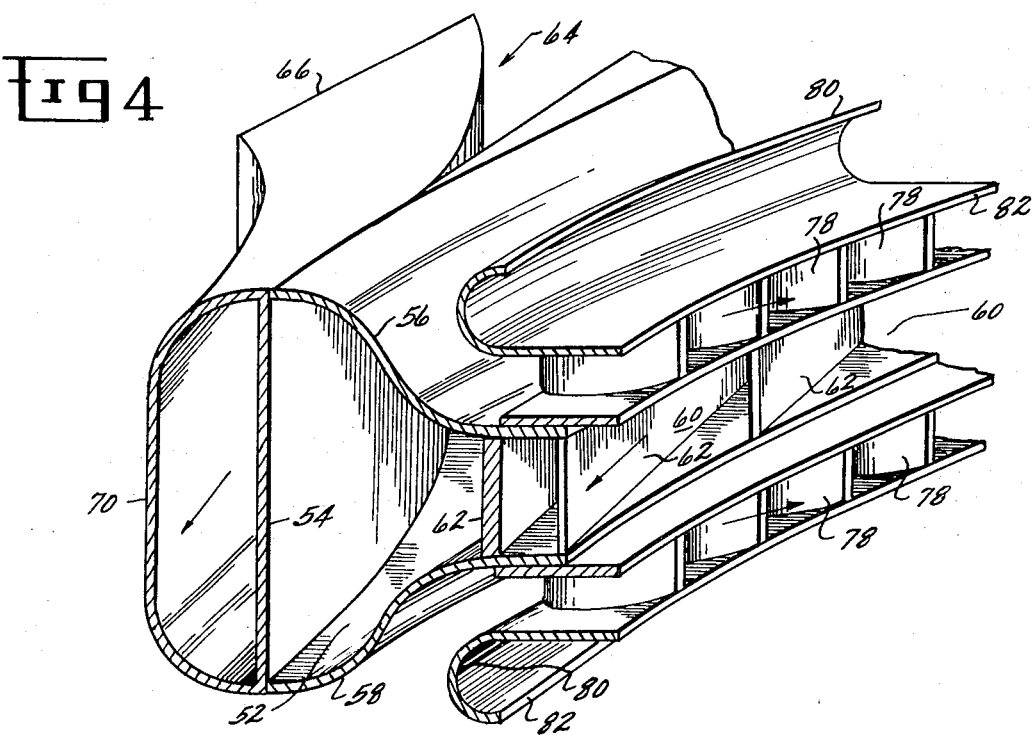
FIG. 4 is a perspective view of a portion of the combustion system of FIG. 2.
Figure 5:
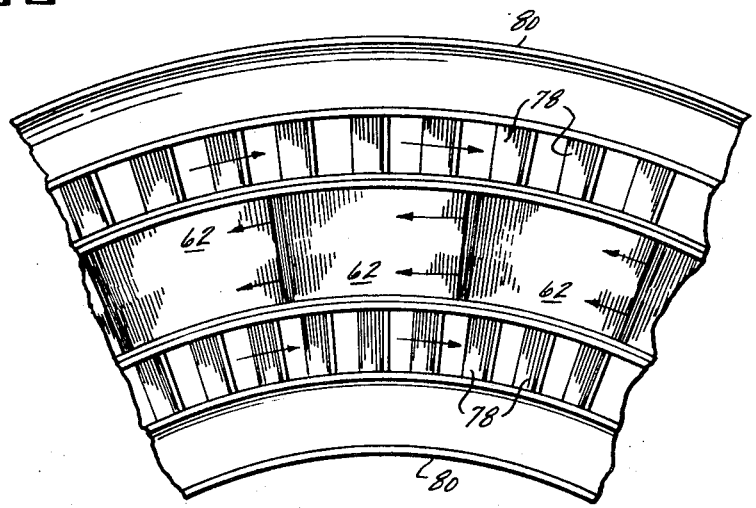
FIG. 5 is a perspective view of an outlet portion of the combustion system shown in FIG. 2.

Located immediately upstream of the dome wall 48, and connected thereto in any appropriate manner, is a fuel carbureting device 50. As shown in FIGS. 3 through 5, the fuel carbureting device 50 includes an annular premixing chamber 52 formed of an upstream wall 54, an outer wall 56, and an inner wall 58. As shown in FIG. 4, the outer wall 56 and the inner wall 58 converge as they extend axially from the upstream wall 54 to form an annular exit slot 60. Positioned within the annular slot 60 are a plurality of radial swirl vanes 62 equally spaced around the annular slot 60 and rigidly connected to the outer wall 56 and the inner wall 58 in any suitable manner.

As further shown in the drawings, the premixing chamber 52 is supplied with air by means of a number of air intakes 64, which are rigidly connected to and equally spaced around the upstream wall 54. The air intakes 64 comprise a smoothly contoured inlet 66, an exit 68 positioned within the premixing chamber 52, and curved walls 69 and 70 which join the inlet 66 and the exit 68. As shown in FIGS. 2 and 3, each of the air intakes 64 is equipped with a suitable fuel injector 72, which in the present case comprises a simple, low pressure fuel injection tube. As further shown in FIG. 2, in certain applications a greater amount of compressor discharge air may be directed toward the air intakes 64 by means of an annular duct 73, which may be positioned within the diffuser passage 24.

The curved walls 69 and 70 of the air intake 64 are configured such that the fuel and air mixture created within the intakes is turned approximately 90° and is discharged into the premixing chamber 52, through the exits 68, in a generally tangential direction. Preferably, the upstream portion of the premixing chamber 52 and the discharge ends of the air intakes 64 are configured such that stagnation regions between the air intakes 64 are eliminated. That is, each of the curved walls 69 and 70 is configured such that the exits 68 of the air intakes 64 generally lie in a single plane as shown in FIG. 3. In this manner, a continuous, tangential fuel and air mixture is introduced into the premixing chamber 52. As further shown in FIG. 3, leading edges 74 of the radial swirl vanes 62 are axially spaced from the exit plane of the air intakes 64. The resulting fuel and air mixture delivered into the premixing chamber 52 thus travels a certain distance around the perimeter of the chamber 52 prior to being affected by the radial swirl vanes 62. The actual distance traveled, and thus the lapse time of the fuel/air mixture within the premix chamber 52, is controlled by varying the axial spacing between the exit planes of the air intakes 64 and the leading edges 74 of the radial swirl vanes 62.

The radial swirl vanes 62 are of generally symmetrical airfoil cross section with trailing edges 76 lying in the plane of the exit of the annular slot 60 as shown in FIG. 3. The swirl vanes 62 are located in the annular slot 60 to turn the fuel and air mixture from a primarily tangential flow direction to a more axial flow direction. The vanes 62 are positioned so as to provide nearly uniform velocity to the fuel and air mixture exiting the annular slot 60. That is, the vanes 62 are positioned to provide an angle of attack to the fuel and air mixture such that no separation occurs across the length of the airfoil. The radial convergence of the outer wall 56 and the inner wall 58 further aids the objective of providing flow of uniform velocity from the annular slot 60. By providing such a uniform velocity flow the possibility of flash back from the primary combustion zone 46 into the premixing chamber 52 is substantially eliminated. Such a flash back normally occurs if a low pressure region exists, because of variations in the flow, between the primary combustion zone and the fuel carbureting device. With the uniform velocity flow, however, the possibility of such a low pressure region is eliminated.

As further shown in FIGS. 3 through 5, additional primary combustion air flow is introduced into the primary combustion zone 46 by means of counterswirl vanes 78 located concentrically around the annular slot 60. Preferably, the additional primary combustion air flow is directed by the counterswirl vanes 78 in a circumferential flow direction counter to that of the fuel and air mixture issuing from the annular slot 60 as shown by the arrows on FIG. 5. For this reason, the counterswirl vanes 78 are cambered and are provided with a curvature counter to that of the radial swirl vanes 62. Air enters the counterswirl vanes 78 through a bellmouth 80 provided upstream thereof as shown in FIG. 2. Axial extensions of the bellmouth 80 forms rings 82 to which the outer ends of the counterswirl vanes 78 may be rigidly connected. The inner ends of the counterswirl vanes 78, on the other hand, are rigidly connected to either the outer wall 56 or the inner wall 58 of the premixing chamber 52.

The counter air flow emanating from the counterswirl vanes 78 provides a region of strong shear at both the inner and outer face of the annular slot 60. The strong shear effect on the fuel and air mixture provides effective and rapid mixing of the fuel and air mixture from the premixing chamber 52 with the additional primary combustion air and also forms flame stabilization regions at the upstream end of the primary combustion zone 46.

In operation, a portion of the compressor discharge air flow from the diffuser passage 24 enters each of the air intakes 64 and is mixed with high energy fuel provided through the fuel injectors 72. The resulting fuel and air mixture is turned approximately 90° and flows into the premixing chamber 52 as a continuous tangential flow. The fuel and air mixture travels a certain distance around the premixing chamber 52 before it is caught by the radial swirl vanes 62 and directed through the annular slot 60.

Another portion of the compressor discharge air flows into the bellmouth 80 and through the counterswirl vanes 78 into the primary combustion zone 46. The remainder of the compressor discharge air flows around the combustor liners 38 and 40 through the passageways 42 and 44 to cool the liners. A portion of this air then enters the primary combustion zone 46 as secondary air through suitable openings in the combustor liners. The fuel and air mixture within the primary combustion zone 46 is then ignited by means of a suitable igniter (not shown), and the high energy gas stream thus formed exits the primary combustion zone and drives the turbine 28 as is well known.

Because the fuel (in the form of a fuel and air mixture) is uniformly introduced into the primary combustion zone 46 around the entire combustor annulus, the annular slot combustor will provide a very uniform circumferential gas temperature distribution. In this manner, the annular slot combustor provides a means of minimizing the hot streak problems and resulting liner and nozzle distress problems presently encountered in many existing combustor designs. As a consequence of this uniform temperature distribution, reduced exit temperature pattern factors, as compared to those found in existing combustor designs, will also result. In addition, the use of a fully annular carbureting chamber will result in both compact, short length combustors and in improved flame propagation characteristics at light-off conditions. Finally, the use of a continuous annular mixing chamber essentially offers a means of significantly reducing the number of fuel injection devices required. Any reduction in the quantity of required fuel injectors represents a significant gain in providing improved fuel systems in terms of weight, cost, reliability and tolerance to contamination.

It should be obvious to one skilled in the art that certain changes could be made in the above-described fuel carbureting device without departing from the broad inventive concept. For example, in certain applications it may be desirable to replace the fuel tubes with a different type of fuel injecting device, such as a simple atomizing nozzle. In addition, it should be obvious to one skilled in the art that the position of the fuel injector 72 could be varied without departing from the broad inventive concepts described herein. Experimentation has shown that the position of the fuel tubes is not critical to the overall operation of the device. In some applications, however, the fuel tube may desirably be located at the bottom of the air intake 64 in order to counteract the effects of the swirl flow on the fuel and air mixture. Finally, the actual shape of the swirl vanes 62 and the counterswirl vanes 78 and the spacing and dimensions thereof could be varied from those shown in the accompanying drawings without departing from the broader inventive concepts described herein. It is intended, therefore, that the appended claims cover these and all similar variations.

What we claim is:

1. A fuel carbureting device for use in a gas turbine engine which includes an annular combustion zone disposed between a pair of liners, said liners defining a primary air inlet to said combustion zone wherein a high energy gas stream is generated, said carbureting device comprising:

an annular premixing chamber having a continuous annular exit slot, said exit slot being substantially coaxial with said annular combustion zone, and said exit slot being disposed within said primary air inlet to said combustion zone;

a plurality of swirl vanes positioned within said exit slot;

means for delivering a fuel and air mixture to said premixing chamber as a tangential flow upstream of said swirl vanes; and means for generating a counterswirl air flow around said exit slot whereby a continuous annular fuel and air mixture is introduced into the combustion zone.

2. A fuel carbureting device as recited in claim 1 wherein said annular premixing chamber includes a generally radially extending upstream wall, an inner wall, and an outer wall, said inner and outer walls extending axially from said upstream wall and converging to form said annular exit slot.

3. A fuel carbureting device as recited in claim 2 wherein said means for delivering said fuel and air mixture includes a plurality of air intakes extending from said upstream wall.

4. A fuel carbureting device as recited in claim 3 wherein each of said air intakes includes an exit for delivering said fuel and air mixture to said premixing chamber, said exits further being characterized in that they generally lie in a single plane.

5. A fuel carbureting device as recited in claim 4 wherein said air intakes turn the air flow approximately 90° from the axial direction.

6. A fuel carbureting device as recited in claim 5 wherein said air intakes are provided with means for injecting fuel into said premixing chamber.

7. A fuel carbureting device as recited in claim 6 wherein said fuel injection means comprise low pressure fuel tubes.

8. A fuel carbureting device as recited in claim 7 wherein said swirl vanes are configured to turn said tangential flow in an axial direction and are positioned such that the fuel and air mixture remains attached thereto along substantially the entire length of said vanes.

9. A fuel carbureting device as recited in claim 8 wherein said counterswirl air flow generating means comprise a plurality of counterswirl vanes which surround said annular slot.

10. A fuel carbureting device as recited in claim 9 wherein said counterswirl vanes are positioned so as to deliver primary combustion air to the combustion zone in a direction counter that of said fuel and air mixture.

11. A gas turbine engine including a compressor for generating an annular gas stream, a turbine for driving said compressor, and a combustion system wherein high energy fuel is introduced into said annular gas stream and ignited to produce a high energy gas stream to drive said turbine, said combustion system including an annular combustion zone disposed between a pair of liners, said liners defining a primary air inlet to said combustion zone and a fuel carbureting device for delivering a fuel and air mixture to said combustion zone, said fuel carbureting device comprising:

an annular premixing chamber having a continuous annular exit slot, said exit slot being substantially coaxial with said annular combustion zone and said exit slot being disposed within said primary air inlet to said combustion zone;

a plurality of swirl vanes positioned within said exit slot;

means for delivering a fuel and air mixture to said premixing chamber as a tangential flow upstream of said swirl vanes; and means for generating a counterswirl air flow around the exit slot whereby a continuous fuel and air mixture is introduced into the combustion zone.

12. A gas turbine engine as recited in claim 11 wherein said means for generating a counterswirl air flow comprise a plurality of counterswirl vanes positioned above and below said annular slot.

13. A gas turbine engine as recited in claim 12 wherein said annular premixing chamber comprises a generally radially extending upstream wall, an inner wall and an outer wall extending axially from upstream wall, said inner and outer walls converging to form said annular exit slot.

14. A gas turbine engine as recited in claim 13 wherein said means for delivering a fuel and air mixture include a plurality of air intakes connected to said upstream wall.

15. A gas turbine engine as recited in claim 14 wherein said air intakes are adapted to turn the air flow approximately 90° from the axial direction and said air intakes are equipped with means for injecting fuel into said premixing chamber.

* * * * *